March 9, 1937.  P. H. SMYTH, JR  2,072,924
CLUTCH
Filed Jan. 24, 1935   2 Sheets-Sheet 1

Paul H. Smyth Jr.
INVENTOR.

BY Threedy and Cannon
HIS ATTORNEY.

March 9, 1937. P. H. SMYTH, JR 2,072,924
CLUTCH
Filed Jan. 24, 1935 2 Sheets-Sheet 2
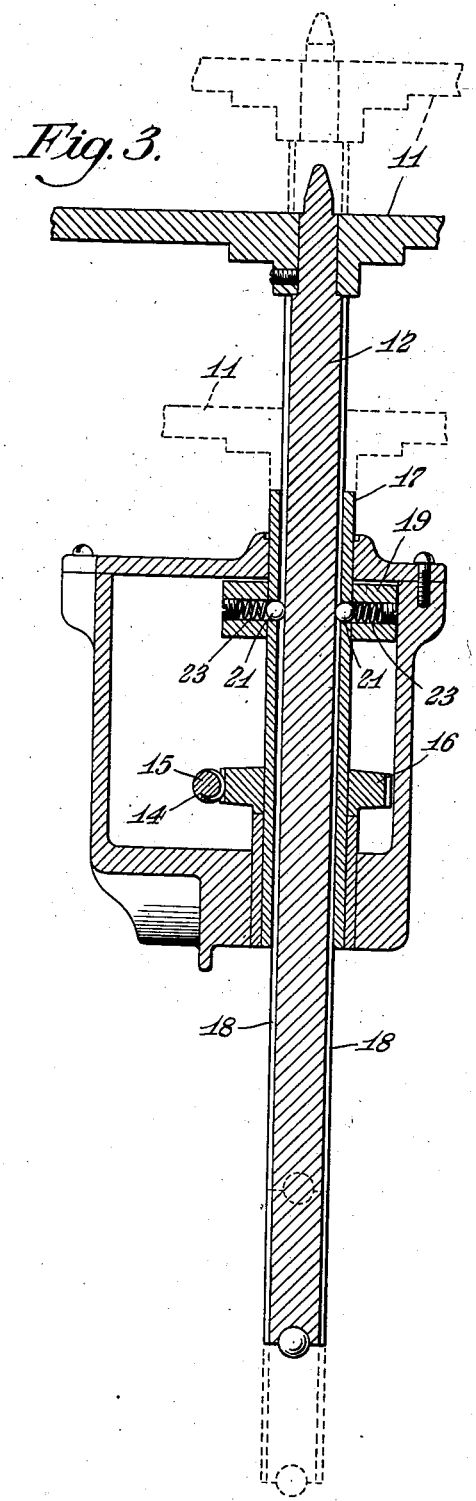
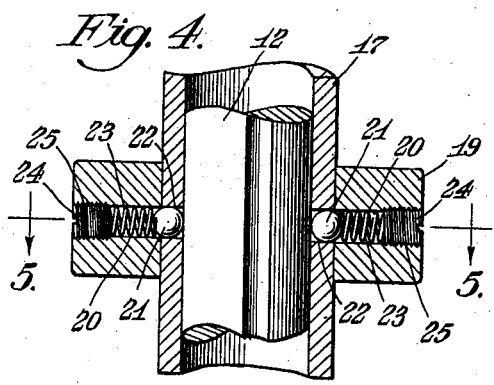
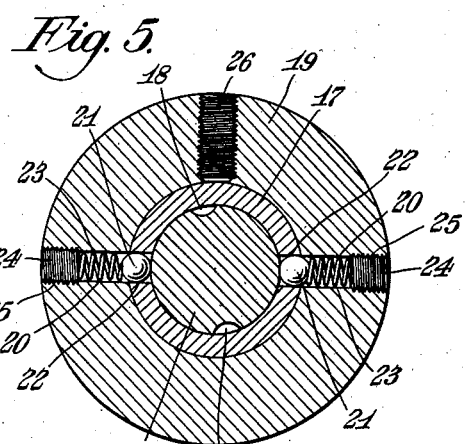
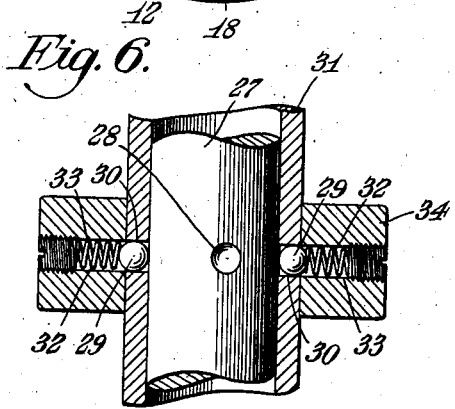
Paul H. Smyth Jr.
INVENTOR.
BY Threedy and Cannon
HIS ATTORNEY.

Patented Mar. 9, 1937

2,072,924

UNITED STATES PATENT OFFICE 2,072,924

CLUTCH

Paul H. Smyth, Jr., Chicago, Ill., assignor to Rock-Ola Manufacturing Company, Chicago, Ill., a corporation of Illinois Application January 24, 1935, Serial No. 3,202

5 Claims. (Cl. 64—29)

This invention relates to a clutch.

It is an object of this invention to provide an improved clutch which is relatively simple and inexpensive in construction and efficient in use.

Another object of the present invention is to provide a novel clutch or cut-off device for disconnecting a driving member from a driven member should the driving member for any reason, become overloaded or stopped during operation thereof.

A further object of the present invention is to provide a novel cut-off device or clutch which is especially adapted for use in conjunction with phonograph apparatus and which operates in such a manner that the shaft which carries the record-supporting disc, is operatively disconnected from the record-supporting disc if, for any reason, the latter becomes overloaded or stops during its rotation, thereby preventing damage to the mechanism and, in particular, preventing the motor which operates the record-supporting disc and its supporting shaft from being burned out.

Other objects will appear hereinafter.

The invention consists in the novel combination and arrangement of parts to be hereinafter described and claimed.

The invention will best be understood by reference to the accompanying drawings, showing the preferred form of construction and in which:

Fig. 3 is a vertical sectional view on line 3—3 in Fig. 2;

Fig. 4 is an enlarged sectional detail view of the new clutch or cut-off device;

Fig. 5 is a sectional view on line 5—5 in Fig. 4; and

Fig. 6 is an enlarged sectional view of a modification of the invention.

Figure 1:
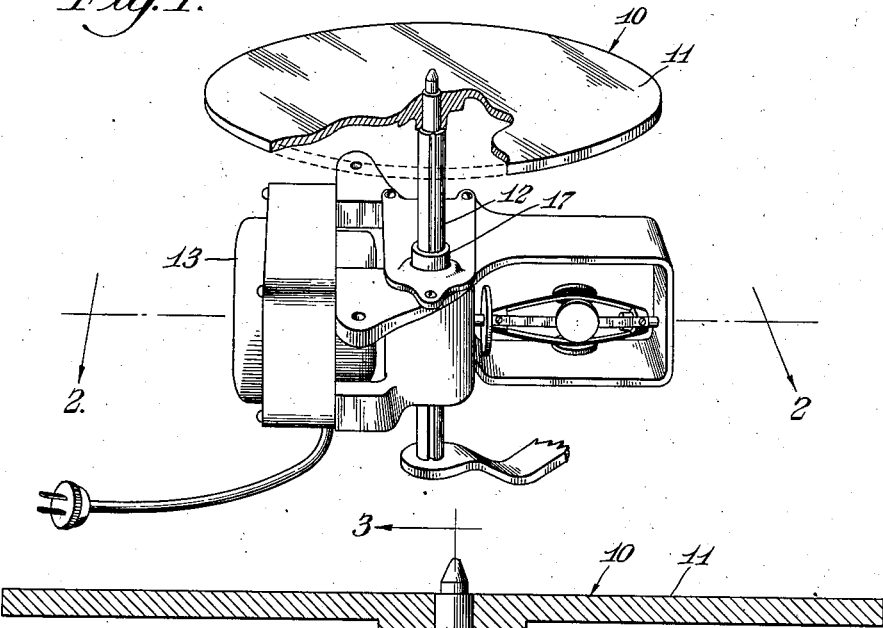
Fig. 1 is a perspective view showing a preferred form of the present invention as applied to, and embodied in, a phonograph apparatus.
Figure 2:
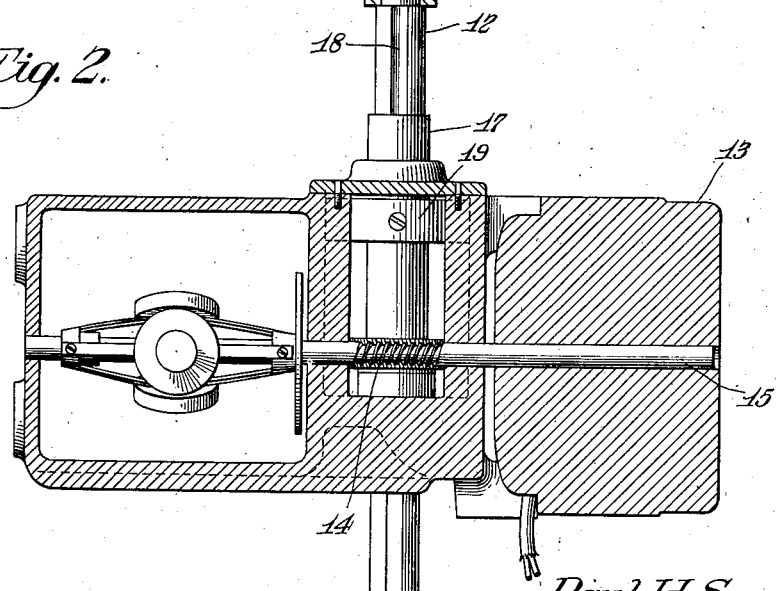
Fig. 2 is a horizontal sectional view on line 2—2 Fig. 1.

A preferred form of the present invention is shown in Figs. 1 to 5 inclusive of the drawings, and is therein shown, for the purpose of illustration, as used in conjunction with a phonograph apparatus, generally indicated at 10.

The phonograph apparatus 10 comprises a record-supporting disc or table 11 which is supported upon and carried by the driven member or shaft 12, in a conventional manner, as shown; the shaft 12 being driven by means of a suitable electric motor 13 and driving shaft 15, through the medium of a suitable power-transmitting device, such as the worm 14 which is formed in the motor shaft 15, and the worm gear 16 which is carried by a sleeve 17, the sleeve 17 being carried by the shaft 12.

Provided in the peripheral surface of the driven shaft 12, at spaced intervals radially therearound, are axially extending grooves or indentations 18, and carried by the sleeve 17 is a housing 19 in which are provided pockets 20. The pockets 20 are arranged at radial intervals around the housing 19 and arranged in each pocket 20 is a latch element in the form of a ball 21. Formed in the driving member or sleeve 17, in communication with the pockets 20, are openings 22 (Figs. 4 and 5) and the latch elements or balls 21 are urged through the openings 22, so as to bear against the peripheral surface of the shaft 12, by means of springs 23 which are arranged into pockets 20; the springs 23 being retained in the pockets 20 and being held compressed therein by means of set screws 24, and the set screws 24 being threaded into tapped openings 25 which are formed as parts of the pockets 20.

The housing 19 is removably clamped to the sleeve 17 by means of a set screw 26.

Operation

The latch elements or balls 21 are normally urged, by the springs 23, through the openings 22 into engagement with the peripheral surface of the shaft 12, and when the motor 13 is set in operation the sleeve 17, and the housing 19 carried thereby, and the balls 21 in the housing 19, are also rotated, by way of the power transmitting device 14—15—16. Accordingly, the latch elements or balls 21 are thus moved, by rotation of the sleeve 17 and housing 19, into registration with the axial grooves 18 in the shaft 12, and the balls 21 are urged into the grooves 18, by the action of the springs 23, so that the sleeve 17, the housing 19 carried thereby, the shaft 12, and the disc 11 carried by the shaft 12 are rotated together as a unit.

However if, for any reason the supporting disc 11 becomes overloaded the torque exerted on the sleeve 17, forces the balls 21 out of the grooves 18, against the action of the springs 23, thereby unlatching or operatively disconnecting the sleeve 17 and motor 13 from the shaft 12 and the record-supporting disc 11. In this manner possible damage to the apparatus, such as the danger of burning out the motor 13, by overloading the record-supporting disc 11, is prevented.

As long as the disc 11 remains overloaded, and the motor 13 and sleeve 17 continue to operate, the latch elements or balls 21 will alternately ride into and out of the indentations or axial grooves 18 in the shaft 12, but as soon as the overload is removed from the record supporting disc 11 the force exerted by the springs 23 upon the balls 21 becomes sufficient to force the balls 21 into the axial grooves 18 against the torque of the shaft 12, thereby latching the shaft 12 and the sleeve 17 together for rotation as a unit.

A modification of the invention is shown in Fig. 6 and is in general the same as the form of the invention shown in Figs. 1 to 5 inclusive except that instead of providing axial grooves such as 18, in the shaft 27, indentations in the form of sockets 28 are provided in the periphery of the shaft 27, and these sockets 28 are arranged at radial intervals around the shaft 27; the latch elements or balls 29 being urged through openings 30 which are formed in the sleeve 31, into engagement with the sockets 28 by means of springs 32 which are arranged in pockets 33, which are formed in a housing 34; the housing 34 being carried by the sleeve 31.

It is to be noted that in the form of the invention shown in Figs. 1 to 5, the indentations have the form of the axially extending grooves 18 so that the shaft 12 and the record-supporting disc 11 carried thereby may be moved axially of the shaft 12 and relative to the latch elements or balls 21, whereas the indentations in the shaft 27 have the form of sockets 28 and are used where the shaft, such as 27, is not intended to be moved axially relative to the latch elements or balls 29. Otherwise the modification shown in Fig. 6 is the same as the form of the invention shown in Figs. 1 to 5 inclusive.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A driving mechanism for a phonograph record supporting table comprising a driven shaft adapted to support the table for rotation in a horizontal plane and provided with spaced axially extending grooves, a motor, a sleeve embracing the driven shaft, driving connection between the sleeve and the motor, and spring-urged latch means carried by the sleeve and engageable in the grooves to operatively couple the sleeve and the driven shaft together and adapted when excess load is applied to the table to unlatch the said sleeve from operation with the driven shaft.

2. Clutch mechanism for phonographs, said mechanism including a sleeve, a shaft revoluble in said sleeve, a clutch housing in the form of a member having a bore and embracing said sleeve, means for securing said housing member in position on said sleeve, said housing having chambered portions communicating into said bore, spring means in said chambered portions and ball means urged by said spring means into yieldable clutching engagement with said shaft, said sleeve being adapted for driving engagement with driving means.

3. Clutch mechanism for phonographs, said mechanism comprising a driven sleeve, a turntable shaft revoluble in said sleeve, a clutch housing member having a central bore and fitted onto said sleeve, said housing member having means threadably movable in a direction radially toward said sleeve to removably secure the same in position on the sleeve, and said housing further having ball means yieldingly urged in a radial direction into clutching engagement with said shaft.

4. Clutch mechanism for phonographs, said mechanism including a driven sleeve, a shaft revoluble in said sleeve, and clutch means in the form of a housing member having a central bore and removably secured on said sleeve, said housing having chambered portions directed radially toward said shaft, spring means in said chambered portions, ball means urged by said spring means into clutching engagement with said shaft through said sleeve, and means threadable into and out of said chambered portions for adjusting the tension of said spring means.

5. Turntable driving mechanism for phonographs, said mechanism comprising a frame, motor means on said frame, a driven sleeve having a peripheral opening and rotatably supported by said frame and driven by said motor, a turntable shaft having an axially extended slot and revoluble in said sleeve, and clutch means including a housing ring embracing said sleeve, said ring having holes directed radially toward said sleeve and shaft therein, means threadable into one of said holes for engagement with said sleeve to hold said housing member in a desired position, spring means in another one of said holes and having a ball member yieldingly urged thereby through said opening in the sleeve and into said slot in said turntable shaft to clutch said sleeve and shaft for conjoint rotation, and means threadable in said last-mentioned hole to adjust the tension of said spring means.

PAUL H. SMYTH, Jr.